United States Patent
Matsuhiro et al.

(10) Patent No.: US 11,380,905 B2
(45) Date of Patent: Jul. 5, 2022

(54) GAS DIFFUSION LAYER FOR FUEL CELL

(71) Applicant: TOYOTA JIDOSHA KABUSHIKI KAISHA, Toyota (JP)

(72) Inventors: Yasushi Matsuhiro, Nukata-gun (JP); Tomoyuki Mizuno, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/142,597

(22) Filed: Jan. 6, 2021

(65) Prior Publication Data
US 2021/0265639 A1 Aug. 26, 2021

(30) Foreign Application Priority Data
Feb. 21, 2020 (JP) .............................. JP2020-028440

(51) Int. Cl.
*H01M 4/88* (2006.01)

(52) U.S. Cl.
CPC ................................. *H01M 4/8807* (2013.01)

(58) Field of Classification Search
CPC .................................................. H01M 4/8807
See application file for complete search history.

(56) References Cited

U.S. PATENT DOCUMENTS

| | | | | |
|---|---|---|---|---|
| 2005/0130025 A1* | 6/2005 | Kadowaki | ........... | H01M 8/0213 429/450 |
| 2006/0046926 A1* | 3/2006 | Ji | ........ | H01M 4/8605 502/101 |
| 2011/0143262 A1* | 6/2011 | Fultz | ........... | H01M 8/1007 429/513 |
| 2012/0070760 A1* | 3/2012 | Ko | ........ | H01M 8/04291 429/456 |
| 2012/0276335 A1* | 11/2012 | Hong | ......... | H01M 8/0234 428/143 |
| 2013/0029247 A1* | 1/2013 | Takami | ......... | H01M 8/10 429/480 |
| 2014/0017589 A1* | 1/2014 | Takami | ......... | H01M 8/0245 429/480 |
| 2017/0317357 A1* | 11/2017 | Utsunomiya | ........ | B32B 9/04 |
| 2017/0373325 A1* | 12/2017 | Okano | ........ | H01M 8/10 |
| 2019/0044153 A1* | 2/2019 | Sode | ........ | H01M 8/0234 |
| 2019/0214651 A1* | 7/2019 | Shigeta | ........ | H01M 8/04149 |

FOREIGN PATENT DOCUMENTS

WO       WO 2018/061833 A1       4/2018

* cited by examiner

*Primary Examiner* — Brian R Ohara
(74) *Attorney, Agent, or Firm* — Finnegan, Henderson, Farabow, Garrett & Dunner, LLP

(57) ABSTRACT

The invention provides a gas diffusion layer for a fuel cell on which a microporous layer is disposed, which can have lower contact resistance with electrode catalyst layers and improved gas diffusion performance. The gas diffusion layer for a fuel cell of the disclosure has a conductive porous substrate layer and a microporous layer laminated in that order, wherein the microporous layer comprises carbon particles and a water-repellent resin, and has an impregnating portion that impregnates the conductive porous substrate layer and a non-impregnating portion that does not impregnate the conductive porous substrate layer, the thickness of the non-impregnating portion is greater than 0.0 μm and 20.0 μm or smaller, and the thickness of the impregnating portion is 29% or lower with respect to the total thickness of the microporous layer.

10 Claims, 1 Drawing Sheet

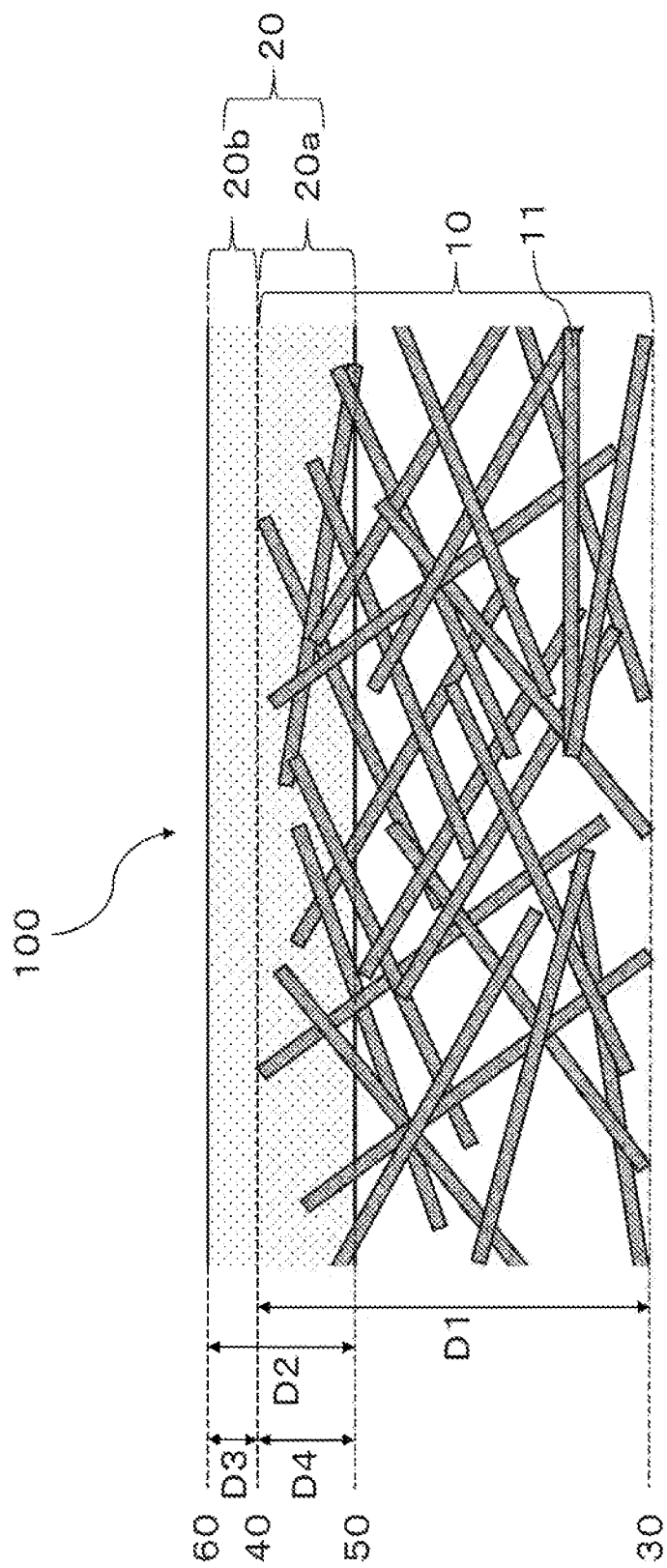

GAS DIFFUSION LAYER FOR FUEL CELL

FIELD

The present disclosure relates to a gas diffusion layer for a fuel cell.

BACKGROUND

Fuel cells are known that generate electricity by chemical reaction between an anode gas such as hydrogen and a cathode gas such as oxygen.

One construction known for such a fuel cell is a stack in the following order: anode side separator, anode side gas diffusion layer, anode side catalyst layer, electrolyte layer, cathode side catalyst layer, cathode side gas diffusion layer, cathode side separator. Assembled stacks obtained by stacking an anode side catalyst layer, electrolyte layer and cathode side catalyst layer are also known as membrane electrode assemblies.

In a fuel cell having such a construction, hydrogen as the anode gas and oxygen as the cathode gas react during the cell reaction, producing water.

It is known that, depending on the construction of the fuel cell, the water produced by the cell reaction sometimes blocks the pores of the fuel cell gas diffusion layer, eventually causing cessation of electricity generation by the fuel cell, known as flooding.

A method for inhibiting flooding is known, wherein the fuel cell gas diffusion layer used is a layered body having a microporous layer comprising conductive microparticles such as carbon black situated on the surface of a water-repellent treated conductive porous substrate layer. In this case the microporous layer may have a structure comprising an impregnating portion that impregnates the conductive porous substrate layer, and a non-impregnating portion that does not impregnate the conductive porous substrate layer.

PTL 1, for example, discloses a gas diffusion layer for a fuel cell wherein the thickness of the non-impregnating portion of the microporous layer is about 10 to 20 μm, and the percentage of the thickness of the impregnating portion with respect to the total thickness of the microporous layer is 30% to 70%.

CITATION LIST

Patent Literature

[PTL 1] International Patent Publication No. WO2018/061833

SUMMARY

Technical Problem

The present inventors have studied how to further improve power generation efficiency in a fuel cell using a gas diffusion layer in which a microporous layer comprising conductive microparticles such as carbon black is situated on the surface of a water-repellent treated conductive porous substrate layer, as disclosed in PTL 1.

In this regard, the present inventors have found that when the fuel cell employs a separator having gas flow paths for circulation of reactive gas in the fuel cell, the average surface pressure applied from the gas diffusion layer onto the electrode catalyst layer becomes uneven, which increases the contact resistance between the gas diffusion layer and the electrode catalyst layer and often lowers the power generation efficiency.

The present inventors have also found that when a fuel cell employs a gas diffusion layer with a microporous layer, the gas diffusibility of the gas diffusion layer is lowered, thus also often lowering the power generation efficiency.

The present inventors therefore studied how to improve the power generation performance of a fuel cell that uses a gas diffusion layer with a microporous layer comprising conductive microparticles such as carbon black on the surface of a water-repellent treated conductive porous substrate layer, by lowering the contact resistance between the gas diffusion layer and the electrode catalyst layer and increasing the gas diffusibility of the gas diffusion layer.

It is an object of the present disclosure to provide a gas diffusion layer for a fuel cell that can have lower contact resistance with the electrode catalyst layer and can improve gas diffusion performance.

Solution to Problem

The present inventors have found that the aforementioned object can be achieved by the following means:

<Aspect 1>

A gas diffusion layer for a fuel cell having a conductive porous substrate layer and a microporous layer laminated in that order, wherein:

the microporous layer comprises carbon particles and a water-repellent resin, and has an impregnating portion that impregnates the conductive porous substrate layer and a non-impregnating portion that does not impregnate the conductive porous substrate layer, the thickness of the non-impregnating portion is greater than 0.0 μm and 20.0 μm or smaller, and the thickness of the impregnating portion is 29% or lower with respect to the total thickness of the microporous layer.

<Aspect 2>

The gas diffusion layer for a fuel cell according to aspect 1, wherein the mean primary particle size of the carbon particles is 25 nm to 70 nm.

<Aspect 3>

The gas diffusion layer for a fuel cell according to aspect 1 or 2, wherein the thickness of the impregnating portion is 8.0 μm or smaller.

<Aspect 4>

The gas diffusion layer for a fuel cell according to any one of aspects 1 to 3, wherein the arithmetic surface roughness of the surface of the non-impregnating portion is 6.0 μm or lower.

<Aspect 5>

The gas diffusion layer for a fuel cell according to any one of aspects 1 to 4, wherein the static contact angle of water on the surface of the non-impregnating portion is 140° or greater.

<Aspect 6>

The gas diffusion layer for a fuel cell according to any one of aspects 1 to 5, wherein:

the conductive porous substrate layer comprises carbon fibers and a binder, and the percentage of carbon fibers with respect to the total of the carbon fibers and the binder is 65 mass % or greater.

<Aspect 7>

The gas diffusion layer for a fuel cell according to any one of aspects 1 to 6, wherein the porosity at least on the side of the conductive porous substrate layer that has the microporous layer is 50% to 75%.

<Aspect 8>

The gas diffusion layer for a fuel cell according to any one of aspects 1 to 7, wherein the thickness of the conductive porous substrate layer is 100.0 µm to 300.0 µm.

<Aspect 9>

The gas diffusion layer for a fuel cell according to any one of aspects 1 to 8, wherein the elastic deformation rate in the direction of lamination is 0.05 MPa$^{-1}$ or greater.

<Aspect 10>

A fuel cell unit cell having a gas diffusion layer for a fuel cell according to any one of aspects 1 to 9.

Advantageous Effects of Invention

According to the disclosure it is possible to provide a gas diffusion layer for a fuel cell that can have lower contact resistance with the electrode catalyst layer and can improve gas diffusion performance.

BRIEF DESCRIPTION OF DRAWINGS

FIG. 1 is a schematic diagram showing a gas diffusion layer for a fuel cell according to one embodiment of the disclosure, as seen from the side.

DESCRIPTION OF EMBODIMENTS

Embodiments of the disclosure will now be described in detail. The disclosure is not limited to the embodiments described below, however, and various modifications may be implemented which do not depart from the gist thereof.

<Gas Diffusion Layer for Fuel Cell>

The gas diffusion layer for a fuel cell of the disclosure has a conductive porous substrate layer and a microporous layer laminated in that order, wherein the microporous layer comprises carbon particles and a water-repellent resin, and has an impregnating portion that impregnates the conductive porous substrate layer and a non-impregnating portion that does not impregnate the conductive porous substrate layer, the thickness of the non-impregnating portion being greater than 0.0 µm and 20.0 µm or smaller, and the thickness of the impregnating portion being 29% or lower with respect to the total thickness of the microporous layer.

FIG. 1 is a schematic diagram showing a gas diffusion layer for a fuel cell according to one embodiment of the disclosure, as seen from the side.

As shown in FIG. 1, the gas diffusion layer for a fuel cell 100 according to one embodiment has a conductive porous substrate layer 10 and microporous layer 20 laminated in that order. The microporous layer 20 has an impregnating portion 20a that impregnates the conductive porous substrate layer 10, and a non-impregnating portion 20b that does not impregnate the conductive porous substrate layer 10. The impregnating portion 20a of the microporous layer 20 soaks into the gaps between the carbon fibers 11 forming the conductive porous substrate layer 10.

While not shown in FIG. 1, the microporous layer 20 comprises carbon particles and a water-repellent resin, the thickness of the non-impregnating portion 20b being greater than 0.0 µm and 20.0 µm or smaller, and the thickness of the impregnating portion 20a being 29% or lower with respect to the total thickness of the microporous layer 20.

FIG. 1 is not intended to place any limit on the gas diffusion layer for a fuel cell according to the disclosure.

The total thickness of the gas diffusion layer for a fuel cell of the disclosure can be determined, for example, by sandwiching both sides of the gas diffusion layer for a fuel cell with flat plates and calculating the average value for the thickness measured at 4 arbitrary points using a microgauge while applying a pressure of 1.1 MPa.

For the total thickness of the microporous layer and the thicknesses of the impregnating portion and the non-impregnating portion of the microporous layer, first the gas diffusion layer for a fuel cell is resin-filled and cross-sectioned, and then an element map is obtained with an electron beam microanalyzer (EPMA), the thicknesses of the impregnating portion and non-impregnating portion of the microporous layer and their percentages with respect to the total thickness of the microporous layer are read off, and the former are multiplied by the total thickness of the gas diffusion layer for a fuel cell.

While it is not our intention to be limited to any particular theory, the principle by which the gas diffusion layer for a fuel cell of the disclosure can reduce contact resistance with the electrode catalyst layer and improve gas diffusion performance is believed to be as follows.

The gas diffusion layer has a microporous layer comprising conductive microparticles such as carbon black, situated on the surface of the water-repellent treated conductive porous substrate layer, and this gas diffusion layer is used by being situated with the microporous layer in contact with the membrane electrode assembly when it is incorporated into a fuel cell unit cell.

The gas diffusion layer for a fuel cell of the disclosure has the conductive porous substrate layer, the impregnating portion of the microporous layer which impregnates the conductive porous substrate layer, and the non-impregnating portion of the microporous layer which does not impregnate the conductive porous substrate layer, disposed in that order.

Since the conductive porous substrate layer and the impregnating portion of the microporous layer comprise materials that constitute the conductive porous substrate layer, they have high electroconductivity. In contrast, the non-impregnating portion of the microporous layer does not comprise material composing the conductive porous substrate layer, and therefore it has low electroconductivity compared to the conductive porous substrate layer and the impregnating portion.

By reducing the thickness of the non-impregnating portion of the microporous layer in the gas diffusion layer for a fuel cell of the disclosure, i.e. by limiting it to greater than 0.0 µm and 20.0 µm or smaller, conductivity on the microporous layer-disposed side of the gas diffusion layer is increased.

That is, while there is increased contact resistance with the electrode catalyst layer due to uneven average surface pressure applied from the gas diffusion layer onto the electrode catalyst layer, the gas diffusion layer for a fuel cell of the disclosure has increased conductivity on the side of the gas diffusion layer that is in contact with the electrode catalyst layer, thereby lowering contact resistance with the electrode catalyst layer.

The microporous layer comprises carbon particles and a water-repellent resin, and has lower porosity than the conductive porous substrate layer and therefore has low gas diffusibility in the in-plane direction and the thickness direction.

Therefore, when the microporous layer has a large thickness at the impregnating portion that impregnates the conductive porous substrate layer, it is thought that this lowers the gas diffusibility in the in-plane direction of the gas diffusion layer. In addition, when the overall thickness of the microporous layer is large, this is thought to lower the gas diffusibility in the thickness direction of the gas diffusion layer.

In the gas diffusion layer for a fuel cell of the disclosure, the thickness of the non-impregnating portion of the microporous layer is greater than 0.0 μm and 20.0 μm or smaller while the thickness of the impregnating portion is 29% or lower with respect to the total thickness of the microporous layer, or in other words, the non-impregnating portion of the microporous layer is formed with a small thickness and the amount of impregnation of the microporous layer into the conductive porous substrate layer is low.

Consequently, the gas diffusion layer for a fuel cell of the disclosure has a small thickness at the impregnating portion that impregnates the conductive porous substrate layer, making it possible to increase the gas diffusibility in the in-plane direction of the gas diffusion layer. In addition, the smaller overall thickness of the microporous layer in the gas diffusion layer for a fuel cell of the disclosure allows the gas diffusibility in the thickness direction of the gas diffusion layer to be increased as well.

The gas diffusion layer for a fuel cell of the disclosure preferably has an elastic deformation rate of 0.05 $MPa^{-1}$ or greater in the direction of lamination.

If the elastic deformation rate in the direction of lamination is limited to this value range, then the fuel cell unit cell comprising the gas diffusion layer for a fuel cell of the disclosure will be less likely to deform when subjected to external stress such as impact, or when the electrolyte membrane undergoes expansion and contraction due to temperature or changes in dryness/humidity changes. Therefore, the structure of the gas diffusion layer for a fuel cell is easier to maintain, and it is possible to simplify the construction for maintaining the structure in the fuel cell unit cell, such as the cell stack construction employed to ensure impact resistance, while production cost can be reduced for the fuel cell unit cell or for a fuel cell module comprising a stack of a plurality of the fuel cell unit cells.

The elastic deformation rate in the direction of lamination may be 0.05 $MPa^{-1}$ or greater, 0.10 $MPa^{-1}$ or greater or 0.50 $MPa^{-1}$ or greater, and 1.00 $MPa^{-1}$ or lower, 0.80 $MPa^{-1}$ or lower or 0.50 $MPa^{-1}$ or lower.

The elastic deformation rate of the gas diffusion layer for a fuel cell can be determined by placing flat plates on either side of the gas diffusion layer for a fuel cell, and calculating the difference between the thickness of the gas diffusion layer for a fuel cell under a load of 0.6 MPa and the thickness of the gas diffusion layer for a fuel cell under a load of 1.0 MPa, applied from both sides.

<Conductive Porous Substrate Layer>

The conductive porous substrate layer used in the gas diffusion layer for a fuel cell of the disclosure may be any porous substrate that is able to provide reactive gas to the membrane electrode assembly and that has electroconductivity.

Such materials include, but are not limited to, materials commonly used in gas diffusion layers for fuel cells, including porous carbon materials such as carbon paper or carbon cloth, and porous metal materials such as metal meshes or foam metal, as conductive members with gas permeability.

Porous carbon materials such as carbon paper and carbon cloth can be formed from carbon fibers and a binder, for example.

When the conductive porous substrate layer comprises carbon fibers and a binder, the proportion of the carbon fibers with respect to the total of the carbon fibers and the binder is preferably 65 mass % or greater.

If the proportion of the carbon fibers with respect to the total of the carbon fibers and the binder is 65 mass % or greater, it will be possible to increase the degree of elastic deformation (springiness) of the conductive porous layer, the layer structure will be resistant to destruction even when the layer is under load, and the conductive porous layer will be less likely to have increased electric resistivity and lowered gas permeability in the thickness direction.

In the gas diffusion layer for a fuel cell of the disclosure, the porosity at least on the side of the conductive porous substrate layer having the microporous layer is preferably 50% to 75%.

The microporous layer can be formed, for example, by applying a slurry containing carbon particles and a water-repellent resin onto the conductive porous substrate layer by coating, and then drying it.

If the porosity at least on the side of the conductive porous substrate layer having the microporous layer is 75% or lower, then the slurry will be unlikely to impregnate the conductive porous substrate layer, making it possible to lower the ratio of the impregnating portion in the microporous layer.

This can reduce the thickness of the portion of the gas diffusion layer for a fuel cell that is impregnated by the microporous layer, thus allowing gas diffusibility in the in-plane direction to be increased.

Moreover, since the microporous layer will be less able to impregnate the fuel cell gas diffusion layer it will be easier to form the non-impregnating portion of the microporous layer to a uniform and constant thickness, and after the conductive porous substrate layer has been disposed on the membrane electrode assembly, it will help to prevent damage to the membrane electrode assembly caused by contact with the materials forming the conductive porous substrate layer, such as the carbon fibers, and will thus allow high leak resistance to be achieved.

If the porosity at least on the side of the conductive porous substrate layer having the microporous layer is 50% or greater, on the other hand, a minimum constant level of porosity will be ensured even at the portion where the microporous layer is impregnating, thus allowing the gas diffusibility to be increased.

The porosity at least on the side of the conductive porous substrate layer having the microporous layer may be 50% or greater, 60% or greater or 70% or greater, and 75% or lower, 70% or lower or 60% or lower.

The thickness of the conductive porous substrate layer in the gas diffusion layer for a fuel cell of the disclosure is preferably 100.0 μm to 300.0 μm.

If the thickness of the conductive porous substrate layer is 100.0 μm or greater, the total thickness of the conductive porous substrate layer can be made much larger than the impregnating portion of the microporous layer, thus allowing gas diffusibility in the in-plane direction to be increased. If the thickness of the conductive porous substrate layer is 300.0 μm or smaller, it will be possible to reduce the thickness of the gas diffusion layer for a fuel cell, or in other words, to reduce the thickness of the fuel cell unit cell, thus allowing the volumetric energy density of the fuel cell unit cell to be increased.

The thickness of the conductive porous substrate layer may be 100.0 μm or greater, 150.0 μm or greater or 200.0 μm or greater, and 300.0 μm or smaller, 250.0 μm or smaller or 200.0 μm or smaller.

<Microporous Layer>

The microporous layer in the gas diffusion layer for a fuel cell of the disclosure comprises carbon particles and a water-repellent resin. The microporous layer may also comprise other components so long as the function of the microporous layer is not inhibited.

The microporous layer also has an impregnating portion that impregnates the conductive porous substrate layer, and a non-impregnating portion that does not impregnate the conductive porous substrate layer.

(Carbon Particles)

Examples of carbon particles include particles of carbon black, graphene or graphite.

The mean primary particle size of the carbon particles may be 25 nm to 70 nm. The mean primary particle size of the carbon particles may be 25 nm or greater, 45 nm or greater or 65 nm or greater, and 70 nm or smaller, 60 nm or smaller or 50 nm or smaller.

The mean primary particle size of the carbon particles is the arithmetic mean value from measured values obtained using an electron microscope such as a transmission electron microscope (TEM) or scanning electron microscope (SEM), based on the unidirectional diameters (Feret diameters) of 100 or more randomly selected particles.

(Water-Repellent Resin)

Water-repellent resins include, but are not limited to, fluorine-based polymer materials such as PTFE, PVDF, polyhexafluoropropylene and tetrafluoroethylene-hexafluoropropylene copolymer, and polypropylene or polyethylene.

(Impregnating Portion)

The impregnating portion of the microporous layer, which impregnates the conductive porous substrate layer, has a thickness of 29% or lower with respect to the total thickness of the microporous layer.

The proportion of the thickness of the impregnating portion with respect to the total thickness of the microporous layer may be greater than 0%, 5% or greater, 15% or greater, 20% or greater or 25% or greater, and 29% or lower, 28% or lower, 25% or lower or 20% or lower.

The thickness of the impregnating portion may be 8.0 μm or smaller.

The thickness of the impregnating portion may be greater than 0.0 μm, 1.5 μm or greater, 3.0 μm or greater or 4.5 μm or greater, and 8.0 μm or smaller, 7.0 μm or smaller, 6.0 μm or smaller or 5.0 μm or smaller.

(Non-Impregnating Portion)

The thickness of the non-impregnating portion of the microporous layer, which does not impregnate the conductive porous substrate layer, is greater than 0.0 μm and 20.0 μm or smaller.

The thickness of the non-impregnating portion may be greater than 0.0 μm, 5.0 μm or greater, 10.0 μm or greater or 15.0 μm or greater, and 20.0 μm or smaller, 15.0 μm or smaller, 10.0 μm or smaller or 5.0 μm or smaller.

The arithmetic surface roughness of the surface of the non-impregnating portion is preferably 6.0 μm or lower.

The surface of the non-impregnating portion of the microporous layer is the surface that contacts with the membrane electrode assembly when the fuel cell stack of the disclosure has been incorporated into a fuel cell unit cell. If the surface of the non-impregnating portion is rough, i.e. if it has a high arithmetic surface roughness, then the membrane electrode assembly may be damaged by the surface of the non-impregnating portion, or holes may open in the membrane electrode assembly causing leakage of reactive gas, depending on the construction of the fuel cell unit cell.

In this regard, if the arithmetic surface roughness of the surface of the non-impregnating portion is 6.0 μm or lower then the surface of the non-impregnating portion will be smooth and the membrane electrode assembly will be unlikely to be damaged when the fuel cell stack of the disclosure has been incorporated into a fuel cell unit cell, allowing leakage of reactive gas to be prevented.

The arithmetic surface roughness of the surface of the non-impregnating portion may be greater than 0.0 μm, 1.0 μm or greater, 2.0 μm or greater or 3.0 μm or greater, and 6.0 μm or lower, 5.0 μm or lower, 4.0 μm or lower or 3.0 μm or lower.

The arithmetic surface roughness Ra of the surface of the non-impregnating portion can be measured according to JIS B 0601:2013. For example, the arithmetic surface roughness Ra of the surface of the non-impregnating portion can be determined by observing the surface of the non-impregnating portion of the microporous layer using a laser microscope, and measuring the arithmetic surface roughness Ra within a predetermined area.

The static contact angle of water on the surface of the non-impregnating portion of the microporous layer is preferably 140° or greater.

Since the microporous layer comprises a water-repellent resin it has a water-repellent property. If the static contact angle of water on the surface of the non-impregnating portion of the microporous layer is 140° or greater, then water produced during cell reaction in the fuel cell unit cell will be more easily discharged from the microporous layer. This can inhibit reduction in gas permeability of the microporous layer during cell reaction. The product water will also be less likely to remain in the microporous layer even after the cell reaction, and reactive gas can be more easily supplied to the microporous layer when cell reaction is restarted.

The static contact angle of water on the surface of the non-impregnating portion of the microporous layer may be 140° or greater. 150° or greater, 160° or greater or 170° or greater, and 180° or smaller, 170° or smaller, 1600 or smaller or 150° or smaller.

The static contact angle of water on the surface of the non-impregnating portion of the microporous layer can be measured according to JIS R3257:1999.

<Method for Producing Gas Diffusion Layer for Fuel Cell>

The gas diffusion layer for a fuel cell of the disclosure can be produced, for example, by treating the conductive porous layer for water-repellency, and then coating the conductive porous layer with a slurry for the microporous layer, and drying and firing it.

The amount of microporous layer slurry that impregnates the conductive porous layer follows the Olsson-Pihl formula. Therefore, the amount of microporous layer slurry impregnating into the conductive porous layer can be adjusted by adjusting the capillary action of the conductive porous layer, the viscosity of the microporous layer slurry and the coating pressure of the microporous layer slurry.

The following is a more concrete method for producing a gas diffusion layer for a fuel cell of the disclosure.

First, a conductive porous layer precursor such as carbon paper is coated with a dispersion of PTFE as a water-repellent treatment solution, allowing it to be impregnated. The conductive porous layer precursor is then dried and fired to prepare a conductive porous layer. Drying and firing may also be repeated.

A microporous layer slurry comprising carbon particles and a water-repellent resin is then prepared and coated onto the conductive porous layer surface using a die coater, for example.

Finally, the microporous layer slurry-coated conductive porous layer is dried and fired.

The gas diffusion layer for a fuel cell of the disclosure can also be produced by a method other than the one described above.

<Fuel Cell Unit Cell>

The fuel cell unit cell of the disclosure has the gas diffusion layer for a fuel cell described above.

The fuel cell unit cell of the disclosure may have a construction comprising an anode separator, an anode side gas diffusion layer, an anode catalyst electrode layer, an electrolyte layer, a cathode catalyst electrode layer, a cathode side gas diffusion layer and a cathode separator, stacked in that order.

The layered body comprising an anode catalyst electrode layer, electrolyte layer and cathode catalyst electrode layer may also be referred to as a "membrane electrode assembly".

EXAMPLES

Examples 1 to 4 and Comparative Examples 1 to 6

Gas diffusion layers for Examples 1 to 4 and Comparative Examples 1 to 6 were prepared in the manner described below and evaluated for contact resistance, gas permeability in the surface-normal direction and in-plane direction, and leak resistance.

Example 1

A gas diffusion layer for Example 1 was prepared in the following manner. The production conditions for the gas diffusion layer of Example 1 are summarized in Table 1 below.

(Preparation of Conductive Porous Substrate Layer)

Carbon paper comprising carbon fibers made with a polyacrylonitrile as a starting material was provided as the substrate for the gas diffusion layer. The carbon paper was rectangular with a basis weight of approximately 5.0 mg/cm$^2$, a thickness of approximately 200 μm and a void percentage of approximately 80%.

A 60% dispersion of polytetrafluoroethylene (PTFE) was diluted with ion-exchanged water and coated onto the carbon paper, allowing it to be impregnated.

(First Drying and Firing)

The PTFE-impregnated carbon paper was then hot air-dried for 3 minutes, dried and fired. The drying temperature was 350° C. Measurement of the cooled substrate weight indicated that 0.5 mg/cm$^2$ PTFE was adhering with respect to the substrate weight.

(Second Drying and Firing)

The PTFE-impregnated carbon paper after the first drying and firing was further hot air-dried for 3 minutes, dried and fired. The drying temperature was 360° C. Measurement of the cooled substrate weight indicated that 0.45 mg/cm$^2$ PTFE was adhering with respect to the substrate weight.

(Formation of Microporous Layer)

Using PTFE with a mean particle size of 0.2 μm as the water-repellent resin and acetylene black with a mean primary particle size of 35 nm as carbon particles, they were dispersed in deionized water until the mass ratio of PTFE and acetylene black was 40:60 (dry weight ratio), to produce a microporous layer slurry having a solid content of 10%. The viscosity of the slurry was about 400 mPa·s (50 s$^{-1}$) as determined using an E-type viscometer. Using a die coater as the coating apparatus, the slurry was coated onto the conductive porous substrate layer at a coating rate of 8.0 cc/min and with a coating gap of 300 μm.

(Third Drying and Firing)

The microporous layer slurry-coated conductive porous substrate layer was then dried and fired at 360° C. for 3 minutes by hot air drying. After firing, it was cooled to obtain a gas diffusion layer for Example 1.

Examples 2 to 4 and Comparative Examples 1 to 6

Gas diffusion layers for Examples 2 to 4 and Comparative Examples 1 to 6 were obtained in the same manner as Example 1, except that the temperature conditions for the first drying and firing and the coating amount and coating gap for coating of the microporous layer slurry onto the conductive porous substrate layer were changed as shown in Table 1.

TABLE 1

| Example | First drying and firing temperature (° C.) | Second drying and firing temperature (° C.) | Third drying and firing temperature (° C.) | Application (cc/min) | Coating gap (μm) |
|---|---|---|---|---|---|
| Example 1 | 350 | 360 | 360 | 2.0 | 300 |
| Example 2 | 350 | 360 | 360 | 1.8 | 300 |
| Example 3 | 350 | 360 | 360 | 1.7 | 300 |
| Example 4 | 350 | 360 | 360 | 1.7 | 300 |
| Comparative Example 1 | 200 | 360 | 360 | 8.0 | 100 |
| Comparative Example 2 | 200 | 360 | 360 | 4.0 | 150 |
| Comparative Example 3 | 200 | 360 | 360 | 4.5 | 100 |
| Comparative Example 4 | 200 | 360 | 360 | 2.0 | 150 |
| Comparative Example 5 | 350 | 360 | 360 | 3.6 | 300 |
| Cemparative Example 6 | 350 | 360 | 360 | 3.5 | 300 |

<Evaluation of Gas Diffusion Layer Structure>
<Evaluation of Gas Diffusion Layer Thickness>

Both sides of each gas diffusion layer were sandwiched between flat plates, and the average value was determined for the thicknesses at the four corners measured using a microgauge while applying a pressure of 1.1 MPa. Next, the gas diffusion layer for a fuel cell of each Example was resin-filled and cross-sectioned, an element map was obtained with an electron beam microanalyzer (EPMA), the thicknesses of the impregnating portion and non-impregnating portion of the microporous layer and their percentages with respect to the total thickness of the microporous layer were read off, and the former were multiplied by the previously obtained total thickness of the gas diffusion layer of each Example, to obtain the thicknesses of the impregnating portion and the non-impregnating portion of the microporous layer, and the total thickness of the microporous layer.

<Evaluation of Surface Smoothness>

The surface of the non-impregnating portion of the microporous layer was observed using a laser microscope and the arithmetic mean roughness of an ~3.0 mm×~3.0 mm-square area was determined.

<Evaluation of Gas Diffusion Layer Performance>
<Evaluation of Contact Resistance>

The gas diffusion layer and catalyst electrode layer of each Example were stacked, and the penetration resistance R1 of the gas diffusion layer and catalyst electrode layer combined, the penetration resistance R2 of the gas diffusion layer, and the penetration resistance R3 of the catalyst electrode layer, were determined using the 4-terminal method, with the contact resistance calculated to be R1−R2−R3. Measurement of the contact resistance was carried out while constraining the stacked gas diffusion layer and catalyst electrode layer by application of a 0.2 MPa load in the thickness direction.

<Evaluation of Gas Diffusion Resistance in Thickness Direction>

A fuel cell unit cell was assembled using the gas diffusion layer of each Example and a commercially available membrane electrode assembly. After humidifying the fuel cell unit cell to an 80% RH environment, the gas diffusion resistance in the thickness direction was determined by the limiting current method. The gas diffusion resistance is smaller with higher gas permeability and larger with lower gas permeability.

<Evaluation of Gas Permeability in in-Plane Direction>

The in-plane direction of the gas diffusion layer of each Example was constrained by application of a 1.8 MPa load using a jig having a matching construction. Dry gas was then injected from the side of the gas diffusion layer at 1, 2 and 3 L/min, the required injected gas pressure was measured, and the gas flow rate was multiplied by the gas pressure to determine the gas permeability in the in-plane direction of the gas diffusion layer.

<Evaluation of Leak Resistance>

The gas diffusion layer of each Example and a commercially available membrane electrode assembly were layered with the microporous layer between them, and the layered stack was constrained by application of a 4.0 MPa load. Electrodes were then connected to the gas diffusion layer side surface and the membrane electrode assembly side surface, respectively, and the current flowing with application of a voltage of 0.2 V was measured. Cases with current exceeding 30 mA were judged to have leakage. This was carried out at three locations on the gas diffusion layer side surface, making an evaluation of "leak resistance" when there was no leakage at any location, or "no leak resistance" when there was leakage at any one location.

<Results>

The evaluation results for the gas diffusion layer structure and performance for each of the Examples are summarized in Table 2.

TABLE 2

| Example | Microporous layer structure | | | | | Evaluation results | | | |
| --- | --- | --- | --- | --- | --- | --- | --- | --- | --- |
| | Impregnating portion thickness (μm) | Non-impregnating portion thickness (μm) | Total microporous layer thickness (μm) | Percentage of impregnating portion thickness with respect to total microporous layer thickness (%) | Surface roughness (μm) | Contact resistance (Ω/cm²) | Gas diffusion resistance in thickness direction | Gas permeability in in-plane direction (m²/s) | Leak resistance |
| Example 1 | 7.7 | 20.0 | 27.7 | 27.8 | 5.3 | 3.7 | 77.0 | 53.0 | OK |
| Example 2 | 6.0 | 20.0 | 26.0 | 23.1 | 5.8 | 3.9 | 77.0 | 57.0 | OK |
| Example 3 | 5.9 | 15.0 | 20.9 | 28.2 | 5.9 | 3.9 | 76.0 | 58.0 | OK |
| Example 4 | 5.0 | 15.0 | 20.0 | 25.0 | 5.9 | 3.6 | 75.0 | 60.0 | OK |
| Comp. Example 1 | 93.0 | 40.0 | 133.0 | 69.9 | 5.5 | 7.0 | 120.0 | 7.0 | OK |
| Comp. Example 2 | 17.0 | 40.0 | 57.0 | 29.8 | 5.4 | 6.5 | 92.0 | 45.0 | OK |
| Comp. Example 3 | 46.0 | 20.0 | 66.0 | 69.7 | 22.0 | 4.0 | 88.0 | 14.0 | NG |
| Comp. Example 4 | 8.5 | 20.0 | 28.5 | 29.8 | 24.0 | 3.8 | 78.0 | 50.0 | NG |
| Comp. Example 5 | 11.5 | 30.0 | 41.5 | 27.7 | 5.3 | 4.8 | 83.0 | 52.0 | OK |
| Comp. Example 6 | 9.0 | 30.0 | 39.0 | 23.1 | 5.2 | 4.5 | 85.0 | 55.0 | OK |

As shown in Table 2, the gas diffusion layers of Examples 1 and 2 each had non-impregnating portion thicknesses of 20.0 μm, while the gas diffusion layers of Examples 3 and 4 had non-impregnating portion thicknesses of 15.0 μm, and therefore all of the thicknesses were small. The Examples all had contact resistance of 3.6 Ω/cm² to 3.9 Ω/cm², which was low contact resistance.

The gas diffusion layers of Examples 1 to 4 all had total microporous layer thicknesses of 20.0 μm to 27.7 μm, which were small thicknesses. In these Examples, the gas diffusion resistance in the thickness direction was 75.0 to 77.0, which was low gas diffusion resistance. This indicates that the gas permeability in the thickness direction was greater in the Examples.

With the gas diffusion layers of Examples 1 to 4, the percentages of the thicknesses of the impregnating portions with respect to the total microporous layer thickness were all 23.1% to 28.2%, which were low values. In these Examples, all of the gas permeabilities in the in-plane direction were 53.0 $m^2/s$ to 60.0 $m^2/s$, which were high gas permeability values for the in-plane direction.

With the gas diffusion layers of Examples 1 to 4, the arithmetic mean roughnesses of the surfaces of the non-impregnating portions of the microporous layers were all 5.3 to 5.9 μm, which were low values. All of the Examples exhibited leak resistance.

Thus, the gas diffusion layers of Examples 1 to 4 simultaneously satisfied the conditions of low contact resistance with the electrode catalyst layer, high gas diffusion performance in the thickness direction and in-plane direction, and leak resistance.

In contrast, Comparative Examples 1 and 2 had low arithmetic mean roughnesses of 5.5 μm and 5.4 μm, respectively, and although they exhibited leak resistance, the total thickness of the microporous layer, the thickness of the non-impregnating portion and the thickness of the impregnating portion were all large, and they exhibited high contact resistance as well as high gas permeability in the thickness direction and in-plane direction.

In Comparative Example 3, the thickness of the non-impregnating portion of the microporous layer was 20 μm, the thickness of the non-impregnating portion was small, and the contact resistance with the electrode catalyst layer was low. However, Comparative Example 3 also had large values for the total thickness of the microporous layer and the thickness of the non-impregnating portion, as well as low gas permeability in the thickness direction and in-plane direction.

In Comparative Example 4, the total thickness of the microporous layer, the thickness of the non-impregnating portion and the thickness of the impregnating portion were all small, but the percentage of the thickness of the impregnating portion with respect to the total thickness of the microporous layer was high at 29.8%. The gas permeability in the in-plane direction was therefore low.

In Comparative Examples 5 and 6, the percentages of the thicknesses of the impregnating portions with respect to the total thicknesses of the microporous layers were both low at 27.7 and 23.1, respectively, and therefore the gas permeability values in the in-plane direction were high. The arithmetic mean roughnesses were also low at 5.3 μm and 5.2 μm, respectively, and therefore leak resistance was exhibited. However, Comparative Examples 5 and 6 also had large total thicknesses of the microporous layers, at 41.5 and 39.0 respectively, and therefore had low gas permeability values in the thickness direction.

REFERENCE SIGNS LIST

10 Conductive porous substrate layer
11 Carbon fibers
20 Microporous layer
20a Impregnating portion
20b Non-impregnating portion
100 Gas diffusion layer for fuel cell

The invention claimed is:

1. A gas diffusion layer for a fuel cell having a conductive porous substrate layer and a microporous layer laminated in that order, wherein:
   the microporous layer
      comprises carbon particles and a water-repellent resin, and
      has an impregnating portion that impregnates the conductive porous substrate layer and a non-impregnating portion that does not impregnate the conductive porous substrate layer,
   the thickness of the non-impregnating portion is greater than 0.0 μm and 20.0 μm or smaller, and
   the thickness of the impregnating portion is 25% or lower with respect to the total thickness of the microporous layer.

2. The gas diffusion layer for a fuel cell according to claim 1, wherein the mean primary particle size of the carbon particles is 25 nm to 70 nm.

3. The gas diffusion layer for a fuel cell according to claim 1, wherein the thickness of the impregnating portion is 8.0 μm or smaller.

4. The gas diffusion layer for a fuel cell according to claim 1, wherein the arithmetic surface roughness of the surface of the non-impregnating portion is 6.0 μm or lower.

5. The gas diffusion layer for a fuel cell according to claim 1, wherein the static contact angle of water on the surface of the non-impregnating portion is 140° or greater.

6. The gas diffusion layer for a fuel cell according to claim 1, wherein:
   the conductive porous substrate layer comprises carbon fibers and a binder, and
   the percentage of carbon fibers with respect to the total of the carbon fibers and the binder is 65 mass % or greater.

7. The gas diffusion layer for a fuel cell according to claim 1, wherein the porosity at least on the side of the conductive porous substrate layer that has the microporous layer is 50% to 75%.

8. The gas diffusion layer for a fuel cell according to claim 1, wherein the thickness of the conductive porous substrate layer is 100.0 μm to 300.0 μm.

9. The gas diffusion layer for a fuel cell according to claim 1, wherein the elastic deformation rate in the direction of lamination is 0.05 $MPa^{-1}$ or greater.

10. A fuel cell unit cell having a gas diffusion layer for a fuel cell according to claim 1.

* * * * *